US012664461B2

(12) United States Patent　　(10) Patent No.:　US 12,664,461 B2
Elogeel et al.　　　　　　　　　　　(45) Date of Patent:　Jun. 23, 2026

(54) VEHICLE SEMANTIC KEYPOINT POINT CLOUD DEFINITION

(71) Applicant: GM CRUISE HOLDINGS LLC, San Francisco, CA (US)

(72) Inventors: Abdelrahman Elogeel, Sunnyvale, CA (US); Alexander Pon, San Francisco, CA (US); Debanjan Nandi, Fremont, CA (US); Andres Hasfura, San Antonio, TX (US); Carden Bagwell, San Francisco, CA (US); Marzieh Parandehgheibi, San Francisco, CA (US); Siddharth Mahendran, Mountain View, CA (US); Teng Liu, Jersey City, NJ (US)

(73) Assignee: GM Cruise Holdings LLC, San Francisco, CA (US)

( * ) Notice: Subject to any disclaimer, the term of this patent is extended or adjusted under 35 U.S.C. 154(b) by 1133 days.

(21) Appl. No.: 17/556,612

(22) Filed: Dec. 20, 2021

(65) Prior Publication Data

US 2023/0196180 A1　　Jun. 22, 2023

(51) Int. Cl.
*G06N 20/00*　　　(2019.01)

(52) U.S. Cl.
CPC .................................... *G06N 20/00* (2019.01)

(58) Field of Classification Search
CPC ................................. G06N 3/08; G06N 20/20
USPC ......................................................... 706/12
See application file for complete search history.

(56) References Cited

U.S. PATENT DOCUMENTS

| | | | | |
|---|---|---|---|---|
| 2019/0310650 A1* | 10/2019 | Halder | ..................... | G06N 3/08 |
| 2023/0072966 A1* | 3/2023 | Batsos | ................ | G06F 18/2113 |
| 2023/0139772 A1* | 5/2023 | Wang | ...................... | G06N 3/08 |
| | | | | 345/419 |

* cited by examiner

*Primary Examiner* — Tony Mahmoudi
(74) *Attorney, Agent, or Firm* — Honigman LLP; Matthew H. Szalach; Jonathan P. O'Brien

(57) ABSTRACT

The subject disclosure relates to techniques for identifying keypoints associated with an object based on LiDAR point cloud data. A process of the disclosed technology can include inputting the LiDAR point cloud data representing an object as perceived by a LiDAR sensor into an algorithm trained to identify the keypoints associated with the object, and identifying, by the algorithm, at least one keypoint associated with the object and a respective confidence score for the at least one keypoint.

17 Claims, 7 Drawing Sheets

200

500

600

VEHICLE SEMANTIC KEYPOINT POINT CLOUD DEFINITION

BACKGROUND

1. Technical Field

The subject technology pertains to identifying keypoints associated with an object based on LiDAR point cloud data, and in particular, the subject technology pertains to inputting into a trained model LiDAR point cloud data and identifying at least one keypoint associated with an object in the LiDAR point cloud data and a respective confidence score for the at least one keypoint.

2. Introduction

Perception is important to help autonomous vehicles operate efficiently. Typically, sensor systems are used to perceive an environment the autonomous vehicles are in. However, in some scenarios, the sensor systems may not be able to perceive and adequately understand the environment the autonomous vehicles are in.

DETAILED DESCRIPTION

Figure 1:
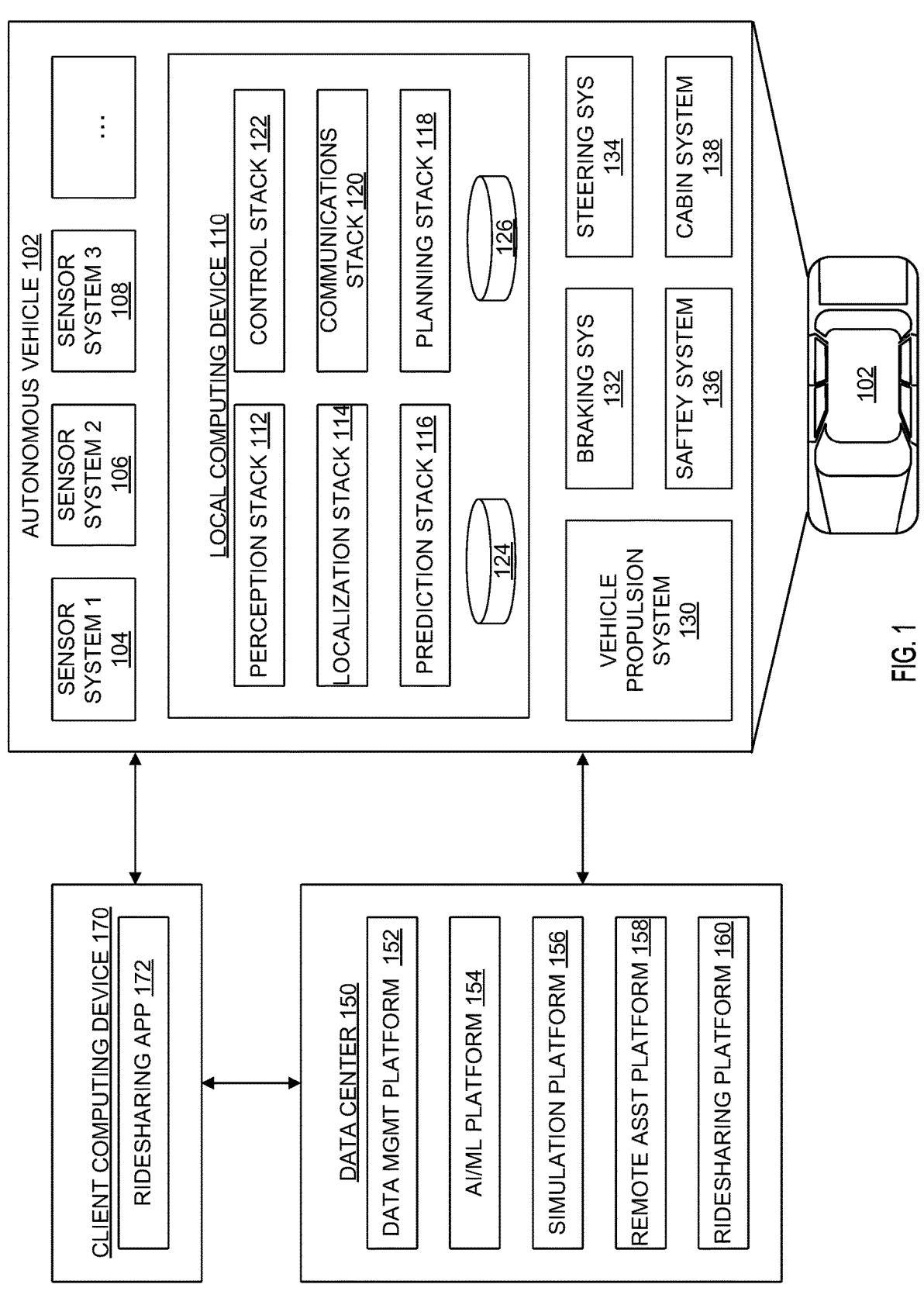
FIG. 1 illustrates an example of a system for managing one or more Autonomous Vehicles (AVs) in accordance with some aspects of the present technology.

Autonomous vehicles utilize various sensor systems to perceive an environment the autonomous vehicles are in. These sensor systems are particularly important to autonomous vehicles because they provide an avenue for the autonomous vehicles to understand and perceive the world around them, so that the autonomous vehicles can operate safely and efficiently. These sensor systems can include Light Detection and Ranging (LiDAR) sensors. LiDAR sensors are used to perceive objects by generating a LiDAR point cloud. However, LiDAR sensors can only perceive objects that have a direct line of sight between the sensor and the object. Additionally, the LiDAR sensors only perceive surfaces that the LiDAR sensors receive light back from. That is, LiDAR sensors can only perceive a portion of an object. To further complicate this, objects can frequently be at least partially occluded. For example, a LiDAR sensor on a vehicle may be positioned behind one vehicle and can only detect and perceive a side mirror of another vehicle directly ahead of the vehicle, but may not be able to detect and perceive the rest of the second (farther) vehicle. This can result in undesirable understanding of the various objects in the nearby environment.

For example, LiDAR point cloud data can be processed to generate bounding boxes around objects in the LiDAR point cloud, such that the bounding box facilitates a spatial understanding of where each object is. When there is insufficient data, these bounding boxes may inadequately identify the spatial location of the object. In the example above with two (partially) perceived vehicles, the side mirror of the farther vehicle may appear to be dangling or floating in mid-air, which would not make sense. In some cases, when data does not make sense to an autonomous vehicle, the autonomous vehicle can classify that portion of the data as an unknown. However, unknowns can result in inefficient operations by the autonomous vehicles.

Another point in the previous example also becomes apparent. In scenarios like the above, where the LiDAR sensor is positioned directly being the closer vehicle, the LiDAR sensor is only able to observe a single edge (e.g., the rear of closer vehicle). In some of these scenarios, bounding boxes generated by the autonomous vehicles around the data may become jittery and improperly identify the spatial location, size, and/or shape of objects in the data because the autonomous vehicle does not have any notion of an uncertainty estimate and cannot perceive a remainder of the vehicle in front of it.

Thus, there is a need in the art to process LiDAR point cloud data to identify these points in the LiDAR point cloud data and an understanding of these points in the overarching context. It is an aspect of the present technology to utilize keypoints of objects to improve tracking of the objects. However, defining what may be a keypoint can also be difficult. Thus, an additional aspect of the technology includes identifying a keypoint as a point that is both valuable and localizable. Once a keypoint is identified, the present technology also teaches using the keypoints to track objects in the LiDAR point cloud data. For example, the present technology teaches using the keypoints by decoupling the localization of observable features and unobservable (e.g., at least partially occluded) features.

FIG. 1 illustrates an example of an AV management system 100. One of ordinary skill in the art will understand that, for the AV management system 100 and any system discussed in the present disclosure, there can be additional or fewer components in similar or alternative configurations. The illustrations and examples provided in the present disclosure are for conciseness and clarity. Other embodiments may include different numbers and/or types of elements, but one of ordinary skill the art will appreciate that such variations do not depart from the scope of the present disclosure.

In this example, the AV management system 100 includes an AV 102, a data center 150, and a client computing device 170. The AV 102, the data center 150, and the client computing device 170 can communicate with one another over one or more networks (not shown), such as a public network (e.g., the Internet, an Infrastructure as a Service (IaaS) network, a Platform as a Service (PaaS) network, a Software as a Service (SaaS) network, other Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.).

The AV 102 can navigate roadways without a human driver based on sensor signals generated by multiple sensor systems 104, 106, and 108. The sensor systems 104-108 can include different types of sensors and can be arranged about the AV 102. For instance, the sensor systems 104-108 can comprise Inertial Measurement Units (IMUs), cameras (e.g., still image cameras, video cameras, etc.), light sensors (e.g., light detection and ranging (LIDAR) systems, ambient light sensors, infrared sensors, etc.), RADAR systems, global positioning system (GPS) receivers, audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. For example, the sensor system 104 can be a camera system, the sensor system 106 can be a LIDAR system, and the sensor system 108 can be a RADAR system. Other embodiments may include any other number and type of sensors.

The AV 102 can also include several mechanical systems that can be used to maneuver or operate the AV 102. For instance, the mechanical systems can include a vehicle propulsion system 130, a braking system 132, a steering system 134, a safety system 136, and a cabin system 138, among other systems. The vehicle propulsion system 130 can include an electric motor, an internal combustion engine, or both. The braking system 132 can include an engine brake, brake pads, actuators, and/or any other suitable componentry configured to assist in decelerating the AV 102. The steering system 134 can include suitable componentry configured to control the direction of movement of the AV 102 during navigation. The safety system 136 can include lights and signal indicators, a parking brake, airbags, and so forth. The cabin system 138 can include cabin temperature control systems, in-cabin entertainment systems, and so forth. In some embodiments, the AV 102 might not include human driver actuators (e.g., steering wheel, handbrake, foot brake pedal, foot accelerator pedal, turn signal lever, window wipers, etc.) for controlling the AV 102. Instead, the cabin system 138 can include one or more client interfaces (e.g., Graphical User Interfaces (GUIs), Voice User Interfaces (VUIs), etc.) for controlling certain aspects of the mechanical systems 130-138.

The AV 102 can additionally include a local computing device 110 that is in communication with the sensor systems 104-108, the mechanical systems 130-138, the data center 150, and the client computing device 170, among other systems. The local computing device 110 can include one or more processors and memory, including instructions that can be executed by the one or more processors. The instructions can make up one or more software stacks or components responsible for controlling the AV 102; communicating with the data center 150, the client computing device 170, and other systems; receiving inputs from riders, passengers, and other entities within the AV's environment; logging metrics collected by the sensor systems 104-108; and so forth. In this example, the local computing device 110 includes a perception stack 112, a mapping and localization stack 114, a prediction stack 116, a planning stack 118, a communications stack 120, a control stack 122, an AV operational database 124, and an HD geospatial database 126, among other stacks and systems.

The perception stack 112 can enable the AV 102 to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 104-108, the mapping and localization stack 114, the HD geospatial database 126, other components of the AV, and other data sources (e.g., the data center 150, the client computing device 170, third party data sources, etc.). The perception stack 112 can detect and classify objects and determine their current locations, speeds, directions, and the like. In addition, the perception stack 112 can determine the free space around the AV 102 (e.g., to maintain a safe distance from other objects, change lanes, park the AV, etc.). The perception stack 112 can also identify environmental uncertainties, such as where to look for moving objects, flag areas that may be obscured or blocked from view, and so forth. In some embodiments, an output of the prediction stack can be a bounding area around a perceived object that can be associated with a semantic label that identifies the type of object that is within the bounding area, the kinematic of the object (information about its movement), a tracked path of the object, and a description of the pose of the object (its orientation or heading, etc.).

The mapping and localization stack 114 can determine the AV's position and orientation (pose) using different methods from multiple systems (e.g., GPS, IMUs, cameras, LIDAR, RADAR, ultrasonic sensors, the HD geospatial database 126, etc.). For example, in some embodiments, the AV 102 can compare sensor data captured in real-time by the sensor systems 104-108 to data in the HD geospatial database 126 to determine its precise (e.g., accurate to the order of a few centimeters or less) position and orientation. The AV 102 can focus its search based on sensor data from one or more first sensor systems (e.g., GPS) by matching sensor data from one or more second sensor systems (e.g., LIDAR). If the mapping and localization information from one system is unavailable, the AV 102 can use mapping and localization information from a redundant system and/or from remote data sources.

The prediction stack 116 can receive information from the localization stack 114 and objects identified by the perception stack 112 and predict a future path for the objects. In some embodiments, the prediction stack 116 can output several likely paths that an object is predicted to take along with a probability associated with each path. For each predicted path, the prediction stack 116 can also output a range of points along the path corresponding to a predicted location of the object along the path at future time intervals along with an expected error value for each of the points that indicates a probabilistic deviation from that point.

The planning stack 118 can determine how to maneuver or operate the AV 102 safely and efficiently in its environment. For example, the planning stack 118 can receive the location, speed, and direction of the AV 102, geospatial data, data regarding objects sharing the road with the AV 102 (e.g., pedestrians, bicycles, vehicles, ambulances, buses, cable cars, trains, traffic lights, lanes, road markings, etc.) or certain events occurring during a trip (e.g., emergency vehicle blaring a siren, intersections, occluded areas, street closures for construction or street repairs, double-parked cars, etc.), traffic rules and other safety standards or practices for the road, user input, and other relevant data for directing the AV 102 from one point to another and outputs from the perception stack 112, localization stack 114, and prediction stack 116. The planning stack 118 can determine multiple sets of one or more mechanical operations that the AV 102 can perform (e.g., go straight at a specified rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the best one to meet changing road conditions and events. If something unexpected happens, the planning stack 118 can select from multiple backup plans to carry out. For example, while preparing to change lanes to turn right at an intersection, another vehicle may aggressively cut into the destination lane, making the lane change unsafe. The planning stack 118 could have already determined an alternative plan for such an event. Upon its occurrence, it could help direct the AV 102 to go around the block instead of blocking a current lane while waiting for an opening to change lanes.

The control stack 122 can manage the operation of the vehicle propulsion system 130, the braking system 132, the steering system 134, the safety system 136, and the cabin system 138. The control stack 122 can receive sensor signals from the sensor systems 104-108 as well as communicate with other stacks or components of the local computing device 110 or a remote system (e.g., the data center 150) to effectuate operation of the AV 102. For example, the control stack 122 can implement the final path or actions from the multiple paths or actions provided by the planning stack 118. This can involve turning the routes and decisions from the planning stack 118 into commands for the actuators that control the AV's steering, throttle, brake, and drive unit.

The communication stack 120 can transmit and receive signals between the various stacks and other components of the AV 102 and between the AV 102, the data center 150, the client computing device 170, and other remote systems. The communication stack 120 can enable the local computing device 110 to exchange information remotely over a network, such as through an antenna array or interface that can provide a metropolitan WIFI network connection, a mobile or cellular network connection (e.g., Third Generation (3G), Fourth Generation (4G), Long-Term Evolution (LTE), 5th Generation (5G), etc.), and/or other wireless network connection (e.g., License Assisted Access (LAA), Citizens Broadband Radio Service (CBRS), MULTEFIRE, etc.). The communication stack 120 can also facilitate the local exchange of information, such as through a wired connection (e.g., a user's mobile computing device docked in an in-car docking station or connected via Universal Serial Bus (USB), etc.) or a local wireless connection (e.g., Wireless Local Area Network (WLAN), Bluetooth®, infrared, etc.).

The HD geospatial database 126 can store HD maps and related data of the streets upon which the AV 102 travels. In some embodiments, the HD maps and related data can comprise multiple layers, such as an areas layer, a lanes and boundaries layer, an intersections layer, a traffic controls layer, and so forth. The areas layer can include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer can include geospatial information of road lanes (e.g., lane centerline, lane boundaries, type of lane boundaries, etc.) and related attributes (e.g., direction of travel, speed limit, lane type, etc.). The lanes and boundaries layer can also include 3D attributes related to lanes (e.g., slope, elevation, curvature, etc.). The intersections layer can include geospatial information of intersections (e.g., crosswalks, stop lines, turning lane centerlines and/or boundaries, etc.) and related attributes (e.g., permissive, protected/permissive, or protected only left turn lanes; legal or illegal u-turn lanes; permissive or protected only right turn lanes;

etc.). The traffic controls lane can include geospatial information of traffic signal lights, traffic signs, and other road objects and related attributes.

The AV operational database 124 can store raw AV data generated by the sensor systems 104-108, stacks 112-122, and other components of the AV 102 and/or data received by the AV 102 from remote systems (e.g., the data center 150, the client computing device 170, etc.). In some embodiments, the raw AV data can include HD LIDAR point cloud data, image data, RADAR data, GPS data, and other sensor data that the data center 150 can use for creating or updating AV geospatial data or for creating simulations of situations encountered by AV 102 for future testing or training of various machine learning algorithms that are incorporated in the local computing device 110.

The data center 150 can be a private cloud (e.g., an enterprise network, a co-location provider network, etc.), a public cloud (e.g., an IaaS network, a PaaS network, a SaaS network, or other CSP network), a hybrid cloud, a multi-cloud, and so forth. The data center 150 can include one or more computing devices remote to the local computing device 110 for managing a fleet of AVs and AV-related services. For example, in addition to managing the AV 102, the data center 150 may also support a ridesharing service, a delivery service, a remote/roadside assistance service, street services (e.g., street mapping, street patrol, street cleaning, street metering, parking reservation, etc.), and the like.

The data center 150 can send and receive various signals to and from the AV 102 and the client computing device 170. These signals can include sensor data captured by the sensor systems 104-108, roadside assistance requests, software updates, ridesharing pick-up and drop-off instructions, and so forth. In this example, the data center 150 includes a data management platform 152, an Artificial Intelligence/Machine Learning (AI/ML) platform 154, a simulation platform 156, a remote assistance platform 158, and a ridesharing platform 160, among other systems.

The data management platform 152 can be a "big data" system capable of receiving and transmitting data at high velocities (e.g., near real-time or real-time), processing a large variety of data and storing large volumes of data (e.g., terabytes, petabytes, or more of data). The varieties of data can include data having different structured (e.g., structured, semi-structured, unstructured, etc.), data of different types (e.g., sensor data, mechanical system data, ridesharing service, map data, audio, video, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), or data having other heterogeneous characteristics. The various platforms and systems of the data center 150 can access data stored by the data management platform 152 to provide their respective services.

The AI/ML platform 154 can provide the infrastructure for training and evaluating machine learning algorithms for operating the AV 102, the simulation platform 156, the remote assistance platform 158, the ridesharing platform 160, the cartography platform 162, and other platforms and systems. Using the AI/ML platform 154, data scientists can prepare data sets from the data management platform 152;

select, design, and train machine learning models; evaluate, refine, and deploy the models; maintain, monitor, and retrain the models; and so on.

The simulation platform 156 can enable testing and validation of the algorithms, machine learning models, neural networks, and other development efforts for the AV 102, the remote assistance platform 158, the ridesharing platform 160, the cartography platform 162, and other platforms and systems. The simulation platform 156 can replicate a variety of driving environments and/or reproduce real-world scenarios from data captured by the AV 102, including rendering geospatial information and road infrastructure (e.g., streets, lanes, crosswalks, traffic lights, stop signs, etc.) obtained from the cartography platform 162; modeling the behavior of other vehicles, bicycles, pedestrians, and other dynamic elements; simulating inclement weather conditions, different traffic scenarios; and so on.

The remote assistance platform 158 can generate and transmit instructions regarding the operation of the AV 102. For example, in response to an output of the AI/ML platform 154 or other system of the data center 150, the remote assistance platform 158 can prepare instructions for one or more stacks or other components of the AV 102.

The ridesharing platform 160 can interact with a customer of a ridesharing service via a ridesharing application 172 executing on the client computing device 170. The client computing device 170 can be any type of computing system, including a server, desktop computer, laptop, tablet, smartphone, smart wearable device (e.g., smartwatch, smart eyeglasses or other Head-Mounted Display (HMD), smart ear pods, or other smart in-ear, on-ear, or over-ear device, etc.), gaming system, or other general purpose computing device for accessing the ridesharing application 172. The client computing device 170 can be a customer's mobile computing device or a computing device integrated with the AV 102 (e.g., the local computing device 110). The ridesharing platform 160 can receive requests to pick up or drop off from the ridesharing application 172 and dispatch the AV 102 for the trip.

Figure 2:
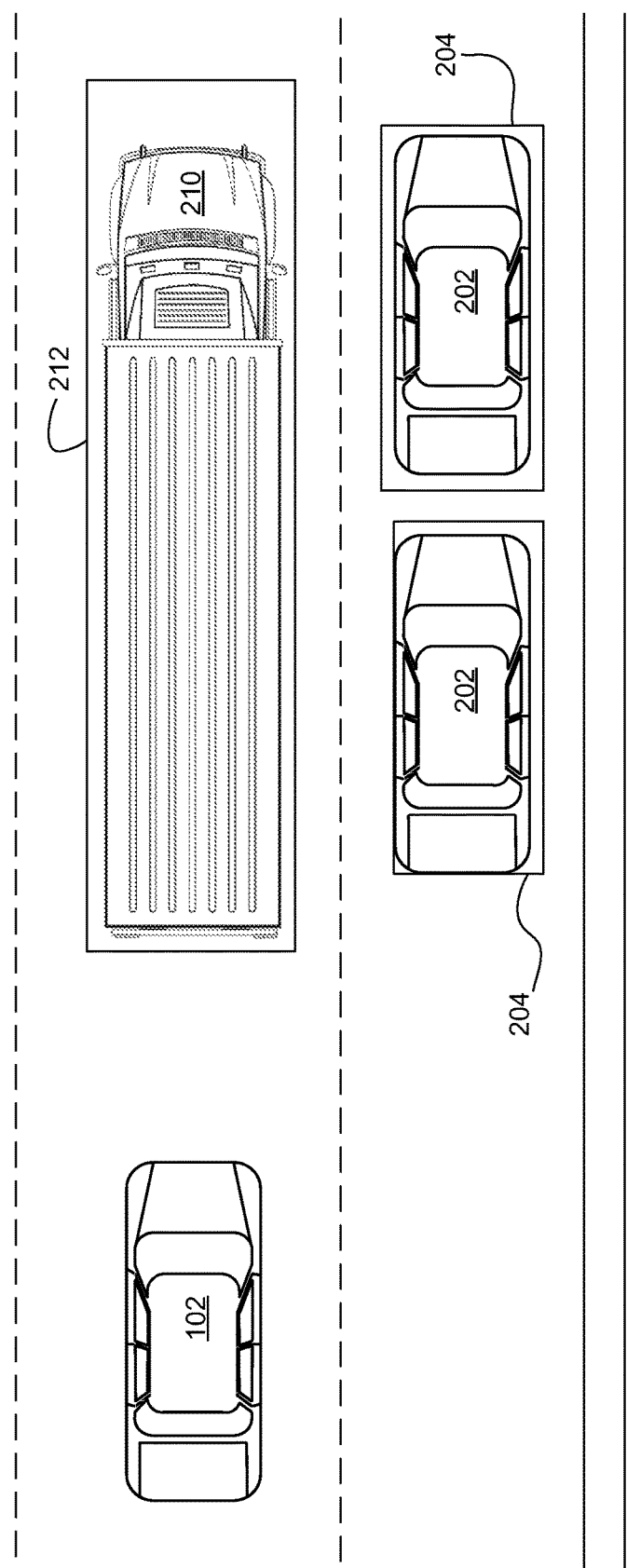
FIG. 2 illustrates an example environment having an autonomous vehicle and various objects in accordance with some aspects of the present technology.

FIG. 2 illustrates an environment 200 having AV 102 navigating along a road and perceiving (e.g., via a LiDAR sensor of sensor systems 104-108) multiple objects 202, 210. More specifically objects 202, 210 can include vehicles 202 and larger vehicles 210 that can at least partially occlude vehicles 202.

Additionally, objects 202, 210 can sometimes "self-occlude." In other words, AV 102 can be positioned in such a way that AV 102 is only able to observe a single edge. This can be particularly common with larger objects 210, like trucks. For example, it can be difficult for AV 102 to determine whether a truck is a long, 18-wheel semi-truck or a typical, smaller-sized moving truck.

Furthermore, current AVs 102 may not have a notion of uncertainty estimation to communicate downstream on how confident perception stack 112 is about tracking estimates. Thus, these occlusions can cause uncommunicated uncertainty and can result in detection instability.

In some embodiments, LiDAR point cloud data of environment 200 can include and/or be processed to include bounding boxes 204, 212 that identify an estimate of the geospatial location, size, and/or shape objects in environment 200. The occlusions discussed above can result in jitters in bounding boxes 204, 212. For example, truck 210 can cause bounding box 212 to constantly change a determined estimate of the length of the truck. In other words, due to the uncertainty of how long the truck is, AV 102 may output different estimates, which results in bounding box

212 oscillating in length. This constant oscillation and jittering of bounding boxes 212 can cause inefficiencies in AV 102 operations.

Figure 3:
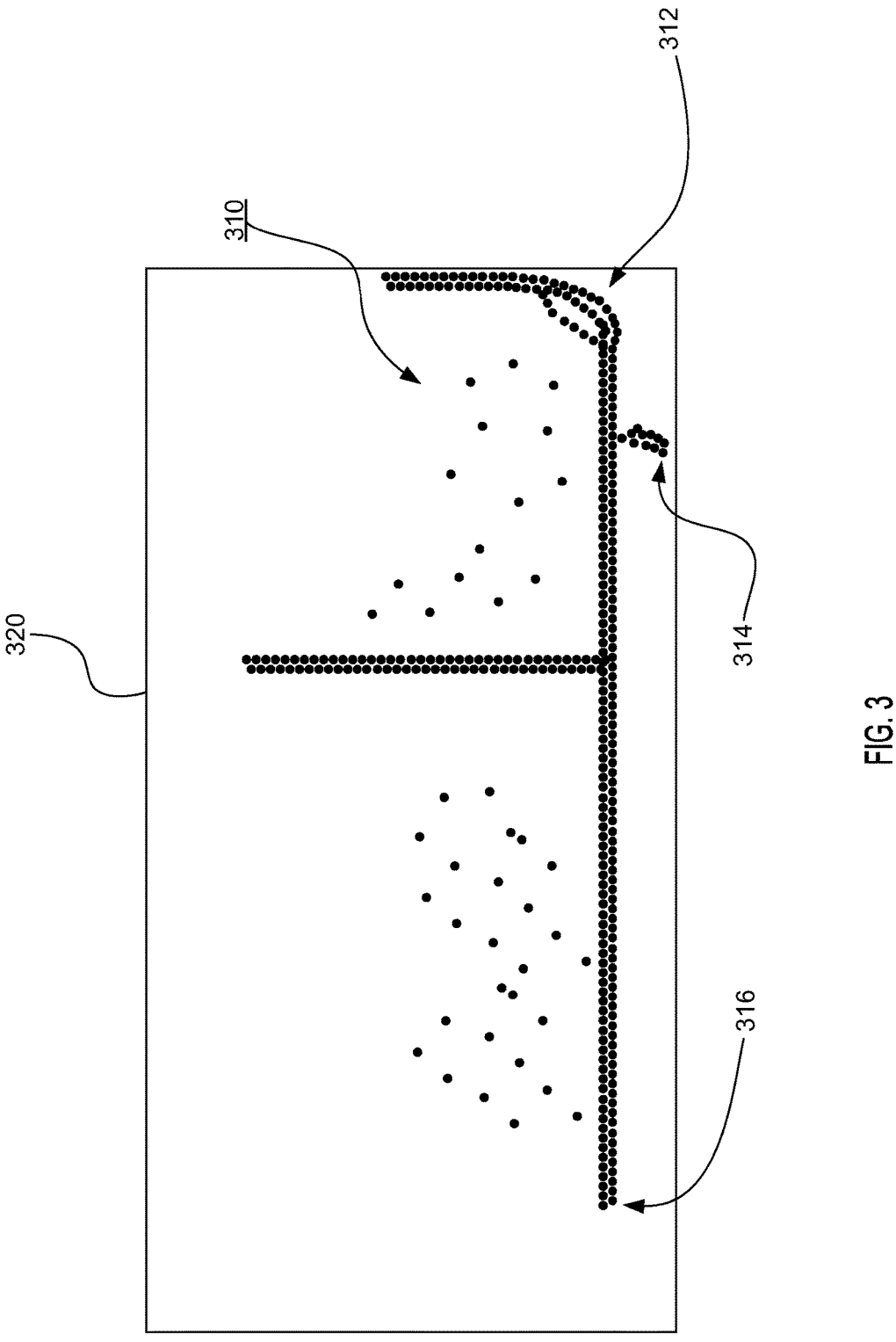
FIG. 3 illustrates a visualization of sensor data in accordance with some aspects of the present technology.

FIG. 3 illustrates a visualization of example data 300 of a LiDAR sensor. More specifically, data 300 can include a LiDAR point cloud 310 as perceived and recorded by a LiDAR sensor (e.g., a LiDAR sensor that is positioned "ahead of" and to "a right" of the object in LiDAR point cloud 310). LiDAR point cloud 310 can capture various surfaces of an object, such as a vehicle. More specifically, some of the various surfaces perceived by the LiDAR sensor and recorded in LiDAR point cloud 310 can include a headlight 312 of the vehicle, a side mirror 314 of the vehicle, and/or a tail end or tail light 316 of the vehicle. It is also considered that data 300 can be processed to generate bounding box 320 around the object (e.g., the vehicle).

The points in LiDAR point cloud 310 can be used to generate and/or identify keypoints that can later be used to track the underlying object. A keypoint is a point that can be used to extrapolate the underlying object from the keypoint. In some embodiments, the keypoints can be a X, Y position and an uncertainty value, where the uncertainty value can also be a confidence score and/or visibility score. In some embodiments, a keypoint can be valuable and localizable. More specifically, the keypoint can be considered to be valuable when tracking the keypoint improves object kinematics. Similarly, the keypoint can be considered to be localizable when the keypoint can be re-labeled and a spatial variance of the keypoint remains consistent. For example, side mirrors 314 may be one or more keypoints because the protrusion of the keypoint can be re-labeled and would vary minimally consistently (e.g., localizable). Additionally, the side mirror could improve object kinematics by allowing a perception system (e.g., perception stack 112) to track the keypoint alone and have an understanding of the kinematics of the overarching vehicle because the side mirror does not move relative to the remainder of the vehicle. For example, labelers can re-label the same segment multiple times then compute the spatial variance of each object keypoint. If it exceeds some predetermined threshold, conclude that the keypoint is inappropriate to be localized within LiDAR alone.

Some examples of keypoints include corners of bounding box 320, edges of bounding box 320, a centroid of bounding box 320, headlights 312, side mirrors 314, taillights 316, other "signatures" or identifiable features of objects, etc. It is further considered that a machine learning model can be trained to identify keypoints (e.g., select points in a LiDAR point cloud as keypoints) that can be used to track objects. In other words, a self-supervised system can be trained to take in both detection and tracking outputs to highlight points where tracking paid most attention to (e.g., consider highly valuable) and use these points as keypoints. While these keypoints may not have a semantic concept associated therewith, these keypoints still provide high value and can be identified consistently by the machine learning model.

In some embodiments, it is considered that the confidence score or uncertainty score can be a function, such that an inverse of a distance from a keypoint in point cloud 310 can be measured against an underlying convex hull of the object. In other words, by generating a convex hull and keeping the keypoint the same, there is an inverse proportionality of the distance between the keypoint and the nearest point on the convex hull which can be used to generate some visibility estimate. The visibility estimate can then be used to generate the confidence score or uncertainty score. Thus, if a keypoint is near an observable edge (e.g., a perimeter of the convex hull), there is likely to be a higher confidence score or visibility score. On the other hand, if a keypoint is far from an observable edge, there is a high likelihood that the keypoint is partially occluded (e.g., not observable in the point cloud) and would result in a low confidence score.

In some embodiments, various convex hulls from different points in time can be used to generate a smooth object over time. More specifically, the convex hull can change from frame to frame due to different LiDAR returns within the bounding box. Thus, to remove the jitter from frame to frame, the convex hulls from different points in time can be smoothed together. Furthermore, the smoothed convex hull surface can also be used to compute and/or measure jitter of each keypoint with respect to a smoothed nearest convex hull surface point.

It is also considered that the bounding boxes or other keypoints can be kinematically smoothed. The kinematically smoothed keypoints can then be used as a base line to compute jitter of the initially selected or extract keypoints.

Another aspect of the present technology includes decoupling the localization of observable features and unobserved features. Instead of using just a single bounding box and have some certainty about how well that object fits, the present technology decouples observable pieces from unobservable pieces. For example, AV 102 may be able to perceive with high confidence side mirror 314 but is unable to perceive a trunk of the vehicle. Thus, AV 102 will be able to identify exactly where side mirror 314 and assign a high confidence score to the side mirror 314, while maintaining a relatively lower confidence score to the trunk.

While the usage of keypoints can facilitate object kinematic tracking, it is to be understood that the usage of keypoints can be used to augment bounding boxes. In other words, bounding boxes for objects of interest can still be predicted. The augmentation by keypoints allows for finer-grained detection. For example, the usage of keypoints will be able to identify an orientation of the rigid underlying body.

Figure 4:
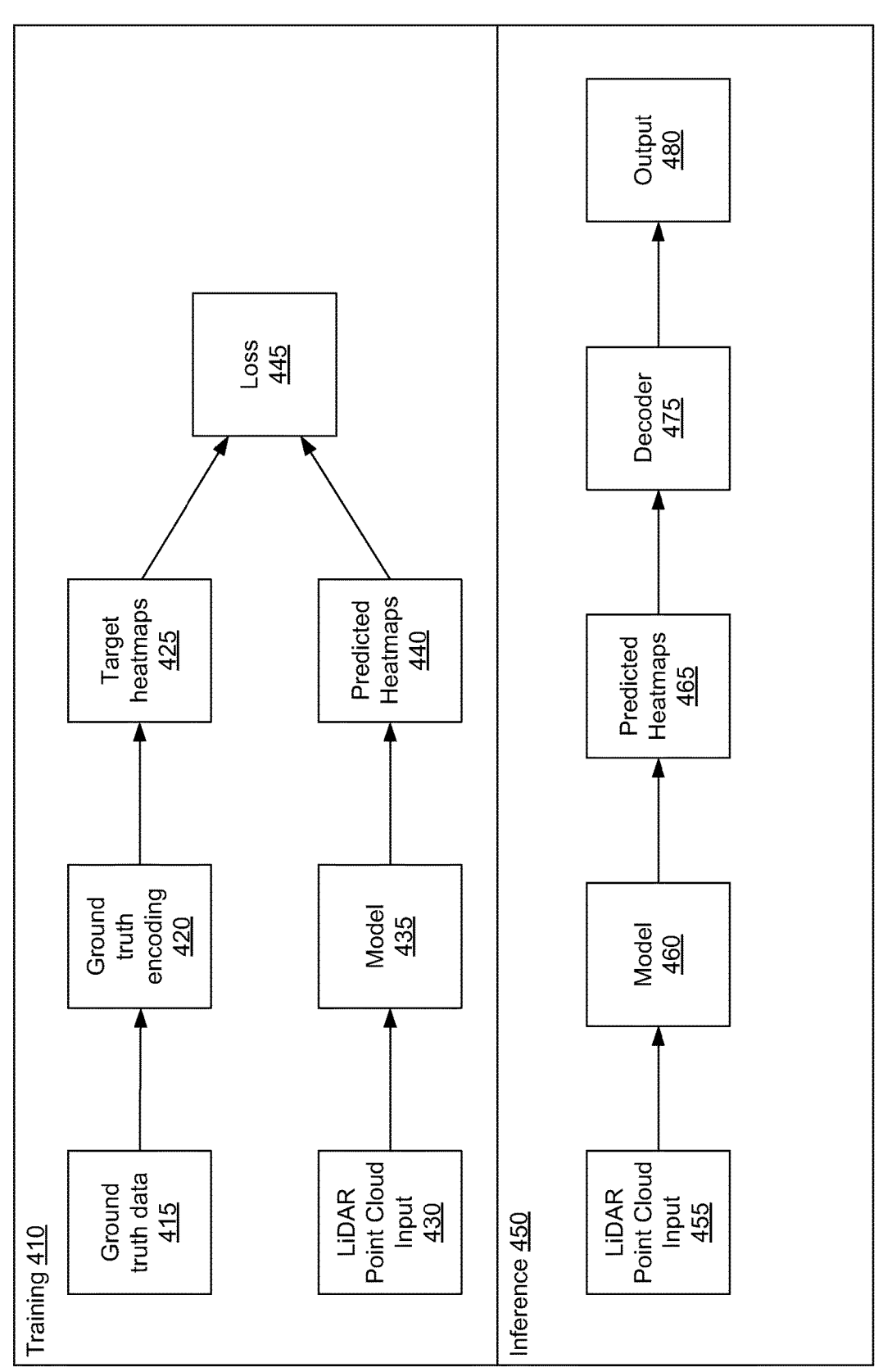
FIG. 4 illustrates an example workflow for training of and inferences by a model for identifying and using keypoints in accordance with some aspects of the present technology.

FIG. 4 illustrates an example workflow 400 that includes a training workflow 410 and an inference workflow 450.

Training workflow 410 can include various modules including, but not limited to, ground truth data 415, ground truth encoding 420, target heatmaps 425, LiDAR point cloud input 430, model 435, predicted heatmaps 440, and loss 445.

Ground truth data 415 can include LiDAR point cloud data that is labeled and processed. For example, the LiDAR point cloud data can be processed to include a bounding box around each object, a label identifying the object, a convex hull identifying a perceived shape of the object, and/or other additive information.

Ground truth encoding 420 can include processing ground truth data 415 to generate target heatmaps 425. In some embodiments, ground truth encoding 420 can include taking explicitly labeled keypoints and applying a blur to the explicitly labeled keypoints to generate target heatmaps 425.

Target heatmaps 425 can include, based ground truth encoding 420 of ground truth data 415, one or more points in the LiDAR point cloud data that are indicative of keypoints. More specifically, one or more points in the LiDAR point cloud can be keypoints that are identified in target heatmaps 425. For example, a passenger side mirror, a headlight, and/or a tail light can be keypoints indicated by target heatmaps 425. In some embodiments, ground truth data 415 can be used as keypoint "seeds," which are used to generate target heatmaps 425. For example, ground truth data 415 can include a pixel in target heatmap 425 that is a function of the given point's distance to a given keypoint and a number of LiDAR points within the pixel's corresponding voxel. Thus, the pixel will have high confidence for observed features nearby the labeled box corner. Over time, this will provide a strong signal on the confidence that a given keypoint is present.

LiDAR point cloud input 430 includes LiDAR point cloud data captured by a LiDAR sensor. In some embodiments, LiDAR point cloud input 430 can be LiDAR point cloud data that is not labeled or otherwise processed.

Model 435 is configured to process LiDAR point cloud input 430 to generate predicted heatmaps 440. In some embodiments, model 435 can be trained based on ground truth data 415, ground truth encoding 420, and target heatmaps 425.

Predicted heatmaps 440 can include, based on model 435 processing LiDAR point cloud input 430, one or more points in the LiDAR point cloud data, such that the one or more points can be indicative of keypoints. For example, model 435 may identify one or more points that are likely to be a passenger side mirror, a headlight, and/or a tail light.

Loss 445 is a measure of uncertainty of the heatmaps against the underlying object. In some embodiments, loss 445 can be an uncertainty that is associated with the likelihood of the presence of a given keypoint in the heatmaps. Loss 445 can be computed based on target heatmaps 425 and predicted heatmaps 440. In some embodiments, loss 445 is computed based on a distance of selected points in target heatmaps 425 and selected points in predicted heatmaps 440. In some embodiments, loss 445 is computed based on a number of selected points in target heatmaps 425 and a number of selected points in predicted heatmaps 440.

Inference workflow 450 can include various modules including, but not limited to, LiDAR point cloud input 455, model 460, predicted heatmaps 465, decoder 475, and output 480.

LiDAR point cloud input 455 can be new LiDAR point cloud data that a LiDAR sensor records or perceives. In some embodiments, LiDAR point cloud input 455 can be LiDAR point cloud data that is not labeled or otherwise processed.

Model 460 is configured to process LiDAR point cloud input 455 to generate predicted heatmaps 465. In some embodiments, model 460 can be trained based on training workflow 410. Additionally, model 460 can also pass losses through predicted heatmaps Predicted heatmaps 465 can identify, based on model 460 processing LiDAR point cloud input 455, one or more points in the LiDAR point cloud data, such that the one or more points can be indicative of keypoints. For example, model 460 may identify one or more points that are likely to be a passenger side mirror, a headlight, and/or a tail light.

Decoder 475 can be configured to utilize and process predicted heatmaps 465 and losses that may be calculated by model 465. More specifically, decoder 475 can be configured to detect and localize keypoints identified in predicted heatmaps 465 to generate output 480.

Output 480 is a usable "skeleton" of the underlying object perceived by the LiDAR sensor. Furthermore, this "skeleton" can be particularly useful for partially or majorly occluded objects. For example, LiDAR point cloud input 455 can include a vehicle that is mostly occluded, with the exception of a passenger side mirror. Workflow 450 generates output 480 that identifies a "skeleton" of the entire vehicle, despite LiDAR point cloud data only including a portion of the vehicle. In some embodiments, decoder 475 can process predicted heatmaps 465 with object bounding boxes to generate output 480. For example, decoder 475 can identify, based on a location of a given point or predicted heatmap relative to a bounding box of the object and determine a position of a "bone" of the "skeleton." In other words, each point can be processed to create and compile the overall "skeleton" of an object. It is also considered that the "skeleton" can identify various keypoints, such that each keypoint identifies an X and Y coordinate position with an associated confidence value. In some embodiments, predicted heatmap 465 can be directly passed into a tracker or perception focused machine learning model to learn the most appropriate representation of keypoints.

Additionally, the present technology proposes various methods of consuming keypoints. For example, a latest keypoint can be used to calculate drift between a corner of a box from a corner of the keypoint and the drift is then passed into a Long Short-Term Memory (LSTM) neural network to determine precise kinematics estimation. Another method for determining precise kinematics can include stacking keypoints temporally and passing the keypoints to a Multilayered Perceptron and/or a PointNet to extract features and then passing the features to a LSTM neural network. Yet another method for determining precise kinematics can include passing the keypoints as-is to a LSTM neural network.

Figure 5:
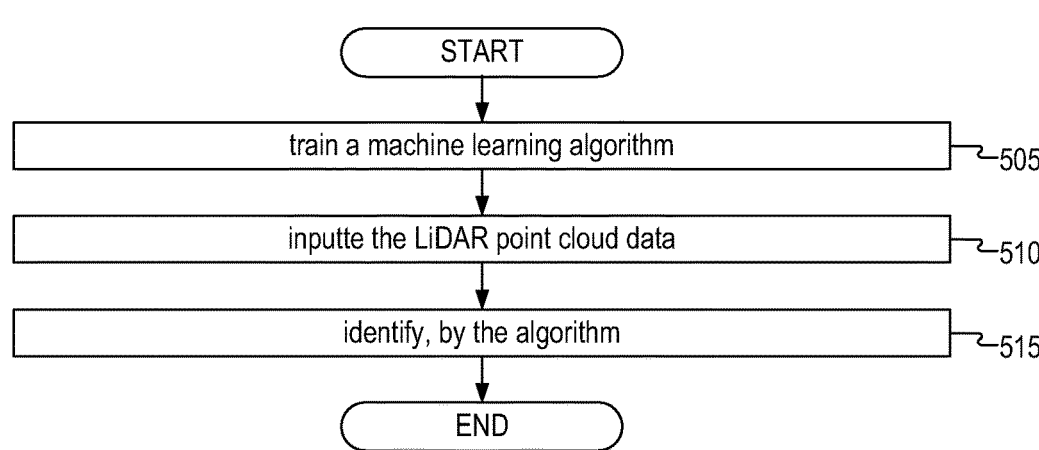
FIG. 5 is a flowchart of a method for identifying keypoints associated with an object based on LiDAR point cloud data in accordance with some aspects of the present technology.

FIG. 5 illustrates an example method 500 for identifying keypoints associated with an object based on LiDAR point cloud data. Although the example method 500 depicts a particular sequence of operations, the sequence may be altered without departing from the scope of the present disclosure. For example, some of the operations depicted may be performed in parallel or in a different sequence that does not materially affect the function of the method 500. In other examples, different components of an example device or system that implements the method 500 may perform functions at substantially the same time or in a specific sequence.

Method 500 includes training 505 a machine learning algorithm to result in an algorithm trained to identify keypoints associated with an object. For example, AI/ML platform 154 illustrated in FIG. 1 may train a machine learning algorithm to result in the algorithm trained to identify keypoints associated with an object.

Training 505 a machine learning algorithm can include processing an existing dataset by inserting training keypoints to generate a labeled training dataset. For example, AI/ML platform 154 illustrated in FIG. 1 may process an existing dataset by insert training keypoints to generate a labeled training dataset. The existing dataset can include a plurality of LiDAR point clouds and ground-truth-labeled bounding-boxes around objects in the LiDAR point clouds. In some embodiments, the training keypoints are inserted on locations on the ground-truth-labeled bounding-boxes.

In some embodiments, respective training confidence score associated with each of the training keypoints can also be provided to the machine learning algorithm. For example, AI/ML platform illustrated in FIG. 1 may provide respective training confidence score associated with each of the training keypoints.

Training 505 the machine learning algorithm can also include inserting a LiDAR point cloud from the existing dataset into the machine learning algorithm. For example, AI/ML platform 154 illustrated in FIG. 1 may insert a LiDAR point cloud from the exist dataset into the machine learning algorithm.

Training 505 the machine learning algorithm can also include receiving an output from the machine learning algorithm including a bounding box around the object in the LiDAR point cloud, keypoints aligned to the bounding box, and respective confidence scores associated with the keypoints aligned to the bounding box. For example, AI/ML platform 154 illustrated in FIG. 1 may receive an output from the machine learning algorithm including a bounding box around the object in the LiDAR point cloud, keypoints aligned to the bounding box, and respective confidence scores associated with the keypoints aligned to the bounding box. In some embodiments, the locations on the ground-truth-labeled bounding-boxes are corners of the ground-truth-labeled bounding-boxes.

Training 505 the machine learning algorithm can include generating a loss value to the machine learning algorithm indicating whether the keypoints were properly located as compared to the labeled training dataset. For example, AI/ML platform 154 illustrated in FIG. 1 may generate a loss value to the machine learning algorithm indicating whether the keypoints were properly located as compared to the labeled training dataset.

In another example of generating a loss value, the loss value can be generated by determining a distance from one of the keypoints aligned to the bounding box to a nearest LiDAR point in the LiDAR point cloud data that is associated with the object. For example, AI/ML platform 154 illustrated in FIG. 1 may determine a distance from one of the keypoints aligned to the bounding box to a nearest LiDAR point in the LiDAR point cloud data that is associated with the object.

Further, processing the existing dataset can include representing the confidence score as a value indicative of the distance from the one of the keypoints to the nearest LiDAR point associated with the object. For example, AI/ML platform 154 illustrated in FIG. 1 may represent the confidence score as a value indicative of the distance from the one of the keypoints to the nearest LiDAR point associated with the object. In some embodiments, a greater distance is correlated to a lower confidence score.

Training 505 the machine learning algorithm can also include generating a loss value to the machine learning algorithm indicating whether the confidence score associated with its respective keypoint is correct. For example, AI/ML platform 154 illustrated in FIG. 1 may generate a loss value to the machine learning algorithm indicating whether the confidence score associated with its respective keypoint is correct. In some embodiments, a result of associating the confidence value to the distance of the keypoint points on the object is that the confidence score is a proxy for how visible the object is near the keypoint, and thereby how confident the trained algorithm can be of the location of that keypoint. In some embodiments, this has the consequence that the representation of the object in keypoints emphasizes the location of observable features over unobservable features. On the other hand, when representing an object by a bounding box the result is that all observable and unobservable features are within the bounding box which can result in unpredictability of the bounding box (e.g., jitter), and determining kinematics of an object based on an unpredictable bounding box can result in uneven kinematics. Thus, by weighting the kinematics of the object more heavily towards to observable features of the object, the objects kinematics are more likely to match the observed kinematics for the visible features of the object.

In some embodiments, training 505 a machine learning algorithm can include creating a labeled training dataset by semantically labeling parts of the object represented in LiDAR point clouds as keypoints. For example, AI/ML platform 154 illustrated in FIG. 1 may create a labeled training dataset by semantically label parts of the object represented in LiDAR point clouds as keypoints.

Training 505 the machine learning algorithm can also include inserting a LiDAR point cloud from the labeled training dataset into the machine learning algorithm. For example, AI/ML platform 154 illustrated in FIG. 1 may insert a LiDAR point cloud from the labeled training dataset into the machine learning algorithm.

Training 505 the machine learning algorithm can also include receiving an output from the machine learning algorithm identifying keypoints and semantic labels associated with respective keypoints. For example, AI/ML platform 154 illustrated in FIG. 1 may receive an output from the machine learning algorithm identifying keypoints and semantic labels associated with respective keypoints.

Training 505 the machine learning algorithm can also include providing a loss value to the machine learning algorithm indicating whether the keypoints were properly located as compared to the labeled training dataset. For example, AI/ML platform 154 illustrated in FIG. 1 may provide a loss value to the machine learning algorithm indicating whether the keypoints were properly located as compared to the labeled training dataset.

Training 505 the machine learning algorithm can also include providing a loss value to the machine learning algorithm indicating whether the semantic labels were properly identified as compared to the labeled training dataset. For example, AI/ML platform 154 illustrated in FIG. 1 may provide a loss value to the machine learning algorithm indicating whether the semantic labels were properly identified as compared to the labeled training dataset.

In some embodiments, training 505 a machine learning algorithm can include inserting a LiDAR point cloud into a self-supervised machine learning algorithm. For example, AI/ML platform 154 illustrated in FIG. 1 may insert a LiDAR point cloud into a self-supervised machine learning algorithm. In some embodiments, the self-supervised machine learning algorithm is configured to optimize keypoint identification such that keypoints that located on similar objects at similar locations to reduce a variance value for locations of detected keypoints on similar objects. In some embodiments, the self-supervised machine learning algorithm is configured to optimize keypoint identification such that keypoints, when tracked over a series of frames, identify object kinematics that closely correspond to a function representing smoothed object kinematics over the series of frames. Through these optimizations, the algorithm trained to identify the keypoints associated with the object is optimized to identify keypoints that are consistently identifiable and result in a better observed object kinematics. In some embodiments, the keypoints do not have a semantic value associated with them.

Method 500 includes inputting 510 the LiDAR point cloud data representing an object as perceived by a LiDAR sensor into an algorithm trained to identify the keypoints associated with the object. For example, perception stack 112 and/or prediction stack 116 illustrated in FIG. 1 may input the LiDAR point cloud data representing an object as perceived by a LiDAR sensor into an algorithm trained to identify the keypoints associated with the object.

Method 500 includes identifying 515, by the algorithm, at least one keypoint associated with the object and a respective confidence score for the at least one keypoint at step 515. For example, perception stack 112 and/or prediction stack 116 illustrated in FIG. 1 may identify, by the algorithm, at least one keypoint associated with the object and a respective confidence score for the at least one keypoint.

Figure 6:
FIG. 6 is a flowchart of a method for tracking keypoints on an object represented in a LiDAR point cloud in accordance with some aspects of the present technology.
Figure 6:
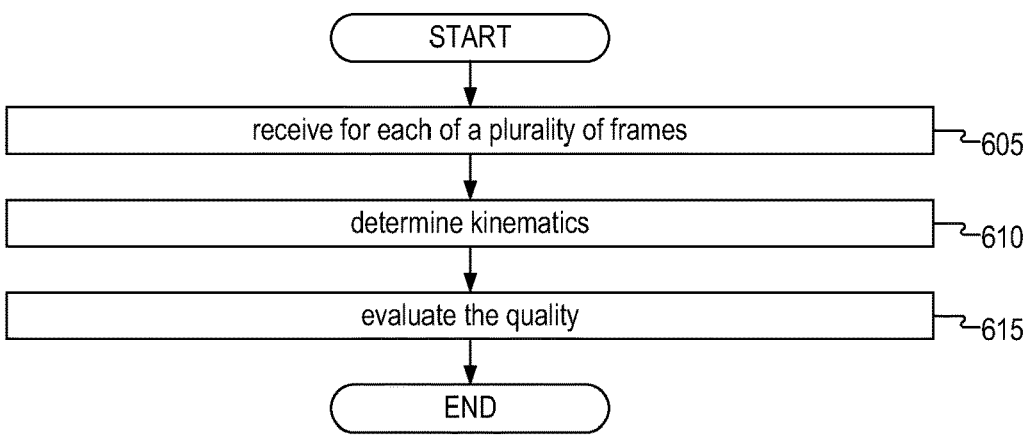

FIG. 6 illustrates an example method 600 for tracking keypoints on an object represented in a LiDAR point cloud. Although the example method 600 depicts a particular sequence of operations, the sequence may be altered without departing from the scope of the present disclosure. For example, some of the operations depicted may be performed in parallel or in a different sequence that does not materially affect the function of the method 600. In other examples, different components of an example device or system that implements the method 600 may perform functions at substantially the same time or in a specific sequence.

Method 600 includes receiving 605 for each of a plurality of frames in a series, an identification of at least one keypoint on the object represented in LiDAR point clouds and a confidence score for the respective keypoint. For example, the AI/ML platform 154 illustrated in FIG. 1 may receive for each of a plurality of frames in a series, an identification of at least one keypoint on the object represented in LiDAR point clouds and a confidence score for the respective keypoint. In some embodiments, the synthesis of the kinematics derived from each of the plurality of keypoints includes weighting an influence of kinematics from each of the plurality of the keypoints based on the confidence score of the respective keypoints. In some embodiments, each of the plurality of frames includes LiDAR point clouds including the object at different times represented in the series. In some embodiments, the at least one keypoint is a plurality of keypoints, and the determining the kinematics of the object from the determined movement of the plurality of the keypoints across the plurality of frames incudes a synthesis of kinematics derived from each of the plurality of keypoints.

Method 600 includes determining 610 kinematics for the object from a determined movement of the keypoint across the plurality of frames. For example, the AI/ML platform 154 illustrated in FIG. 1 may determine kinematics for the object from a determined movement of the keypoint across the plurality of frames.

In some embodiments, determining 610 kinematics for the object can include identifying the keypoint in the frames of the series and extracting features pertaining to the keypoint using a multi-layer perceptron neural network. For example, AI/ML platform 154 illustrated in FIG. 1 may identify the keypoint in the frames of the series and extract features pertaining to the keypoint using a multi-layer perceptron neural network.

Further, determining 610 kinematics for the object can also include passing the identification of the keypoint and the extracted features from the multi-layer perceptron neural network to a long short-term memory (LSTM) neural network which outputs the determined kinematics. For example, AI/ML platform 154 in FIG. 1 may pass the identification of the keypoint and the extracted features from the multi-layer perceptron neural network to a long short-term memory (LSTM) neural network which outputs the determined kinematics.

In some embodiments, determining 610 kinematics for the object can include identifying the keypoint on a bounding box enveloping the object and calculating a distance between the keypoint on the bounding box and a nearest LiDAR point located on the object. For example, the AI/ML platform 154 illustrated in FIG. 1 may identify the keypoint on a bounding box enveloping the object and calculate a distance between the keypoint on the bounding box and a nearest LiDAR point located on the object.

Further, determining 610 kinematics for the object can also include passing the identification of the keypoint and the distance between the keypoint on the bounding box and a nearest LiDAR point located on the object to a long short-term memory (LSTM) neural network which outputs the determined kinematics. For example, the AI/ML platform 154 illustrated in FIG. 1 may pass the identification of the keypoint and the distance between the keypoint on the bounding box and a nearest LiDAR point located on the object to a long short-term memory (LSTM) neural network which outputs the determined kinematics.

In some embodiments, determining 610 kinematics for the object can include identifying the keypoint in the frames of the series and extracting features pertaining to the keypoint using a PointNet. For example, the AI/ML platform 154 illustrated in FIG. 1 may identify the keypoint in the frames of the series and extract features pertaining to the keypoint using a PointNet.

Further, determining 610 kinematics for the object can also include passing the identification of the keypoint and the extracted features from the PointNet to a long short-term memory (LSTM) neural network which outputs the determined kinematics. For example, the AI/ML platform 154 illustrated in FIG. 1 may pass the identification of the keypoint and the extracted features from the PointNet to a long short-term memory (LSTM) neural network which outputs the determined kinematics.

In some embodiments, determining 610 kinematics for the object can include tracking the keypoint across the plurality of frames. For example, the AI/ML platform 154 illustrated in FIG. 1 may track the keypoint across the plurality of frames.

Further, determining 610 kinematics for the object can also include passing the identification of the keypoint in the point cloud to a long short-term memory (LSTM) neural network which outputs the determined kinematics. For example, the AI/ML platform 154 illustrated in FIG. 1 may pass the identification of the keypoint in the point cloud to a long short-term memory (LSTM) neural network which outputs the determined kinematics.

Method 600 includes evaluating 615 the quality of the determination of the kinematics. For example, the AI/ML platform 154 illustrated in FIG. 1 may evaluate the quality of the determination of the kinematics.

In some embodiments, evaluating the quality of the determination of the kinematics includes comparing the determined kinematics against a function representing smoothed object kinematics over the series of frames. For example, the AI/ML platform 154 illustrated in FIG. 1 may evaluate the quality of the determination of the kinematics by comparing the determined kinematics against a function representing smoothed object kinematics over the series of frames. In some embodiments, a variance of the determined kinematics as compared to the smoothed object kinematics represents the quality of the determination of the kinematics.

In some embodiments, evaluating 615 the quality of the determination of the kinematics includes determining a variance of a distance from the keypoint to the nearest LiDAR point located on the object over the plurality of frames in the series. For example, the AI/ML platform 154 illustrated in FIG. 1 may evaluate the quality of the determination of the kinematics by determining a variance of a distance from the keypoint to the nearest LiDAR point located on the object over the plurality of frames in the series. In some embodiments, a lower variance in the distance represents a greater quality of the determination of the kinematics because the keypoint is more closely representative of the object over time.

Figure 7:
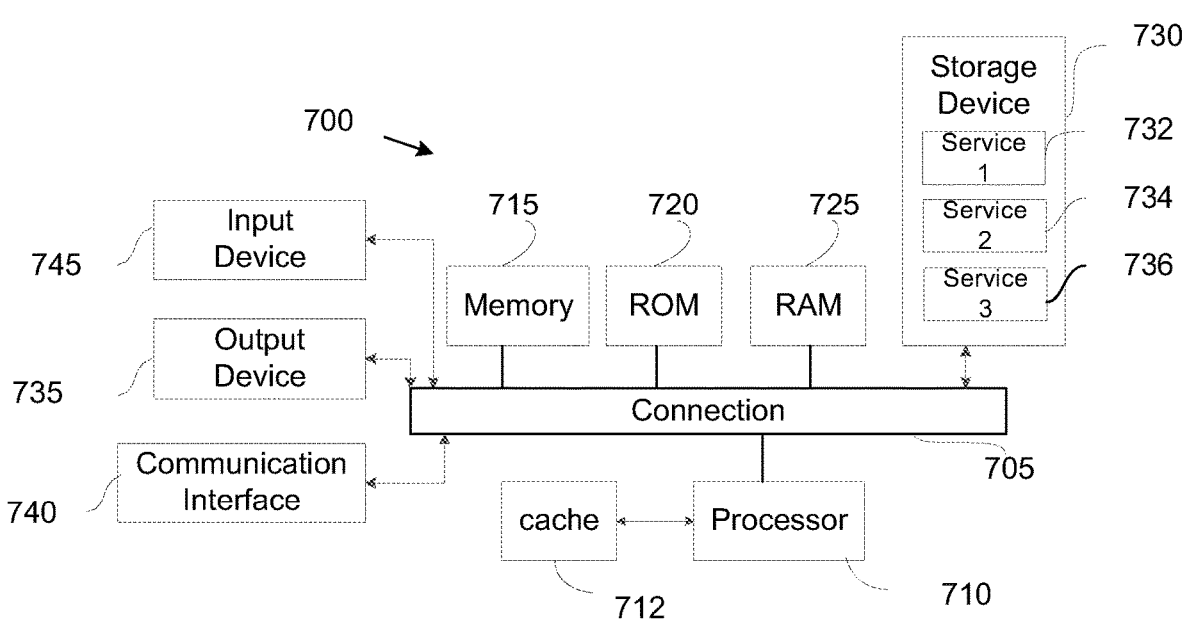
FIG. 7 shows an example of a system for implementing certain aspects of the present technology.

FIG. 7 shows an example of computing system 700, which can be for example any computing device making up autonomous vehicle 102, local computing device 110, data center 150, client computing device 170, or any component thereof in which the components of the system are in communication with each other using connection 705. Connection 705 can be a physical connection via a bus, or a direct connection into processor 710, such as in a chipset architecture. Connection 705 can also be a virtual connection, networked connection, or logical connection.

In some embodiments, computing system 700 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 700 includes at least one processing unit (CPU or processor) 710 and connection 705 that couples various system components including system memory 715, such as read-only memory (ROM) 720 and random access memory (RAM) 725 to processor 710. Computing system 700 can include a cache of high-speed memory 712 connected directly with, in close proximity to, or integrated as part of processor 710.

Processor 710 can include any general purpose processor and a hardware service or software service, such as services 732, 734, and 736 stored in storage device 730, configured to control processor 710 as well as a special-purpose processor where software instructions are incorporated into the actual processor design. Processor 710 may essentially be a completely self-contained computing system, containing multiple cores or processors, a bus, memory controller, cache, etc. A multi-core processor may be symmetric or asymmetric.

To enable user interaction, computing system 700 includes an input device 745, which can represent any number of input mechanisms, such as a microphone for speech, a touch-sensitive screen for gesture or graphical input, keyboard, mouse, motion input, speech, etc. Computing system 700 can also include output device 735, which can be one or more of a number of output mechanisms known to those of skill in the art. In some instances, multimodal systems can enable a user to provide multiple types of input/output to communicate with computing system 700. Computing system 700 can include communications interface 740, which can generally govern and manage the user input and system output. There is no restriction on operating on any particular hardware arrangement, and therefore the basic features here may easily be substituted for improved hardware or firmware arrangements as they are developed.

Storage device 730 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 730 can include software services, servers, services, etc., that when the code that defines such software is executed by the processor 710, it causes the system to perform a function. In some embodiments, a hardware service that performs a particular function can include the software component stored in a computer-readable medium in connection with the necessary hardware components, such as processor 710, connection 705, output device 735, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

What is claimed is:

1. A method of identifying keypoints associated with an object based on Light Detection and Ranging (LiDAR) point cloud data, the method comprising:

inputting the LiDAR point cloud data representing an object as perceived by a LiDAR sensor of a vehicle into an algorithm trained to identify the keypoints associated with the object wherein the keypoints represent localizable and trackable physical aspects of the object;

identifying, by the algorithm, at least one keypoint associated with the object and a respective confidence score for the at least one keypoint;

determining, based on the at least one keypoint, a navigation path for the vehicle;

navigating the vehicle along the navigation path; and training a machine learning algorithm to result in the algorithm trained to identify the keypoints associated with the object, wherein training the machine learning algorithm comprises:

creating a labeled training dataset by semantically labeling parts of the object represented in LiDAR point clouds as keypoints;

inserting a LiDAR point cloud from the labeled training dataset into the machine learning algorithm;

receiving an output from the machine learning algorithm identifying keypoints and semantic labels associated with respective keypoints;

providing a loss value to the machine learning algorithm indicating whether the keypoints were properly located as compared to the labeled training dataset; and providing a loss value to the machine learning algorithm indicating whether the semantic labels were properly identified as compared to the labeled training dataset.

2. The method of claim 1, wherein training the machine learning algorithm further comprises:

processing an existing dataset by inserting training keypoints to generate a labeled training dataset, wherein the existing dataset includes a plurality of LiDAR point clouds and ground-truth-labeled bounding boxes around objects in the LiDAR point clouds, and the training keypoints are inserted on locations on the ground-truth-labeled bounding boxes, wherein the training keypoints represent localizable and trackable physical aspects of the locations on the ground-truth-labeled bounding boxes;

inserting a LiDAR point cloud from the existing dataset into the machine learning algorithm;

receiving an output from the machine learning algorithm including a bounding box around the object in the LiDAR point cloud, keypoints aligned to the bounding box, and respective confidence scores associated with the keypoints aligned to the bounding box; and generating a loss value to the machine learning algorithm indicating whether the keypoints were properly located as compared to the labeled training dataset.

3. The method of claim 2, wherein the locations on the ground-truth-labeled bounding boxes are corners of the ground-truth-labeled bounding boxes.

4. The method of claim 2, wherein processing the existing dataset by inserting the training keypoints to result in the labeled training dataset further comprises:

providing a respective training confidence score associated with each of the training keypoints.

5. The method of claim 4, wherein determining each of the respective confidence scores associated with the keypoints comprises:

determining a distance from one of the keypoints aligned to the bounding box to a nearest LiDAR point in the LiDAR point cloud data that is associated with the object; and representing the confidence score as a value indicative of the distance from the one of the keypoints to the nearest LiDAR point associated with the object, wherein a greater distance is correlated to a lower confidence score.

6. The method of claim 5, wherein the training the machine learning algorithm further comprises:

generating a loss value to the machine learning algorithm indicating whether the confidence score associated with its respective keypoint is correct.

7. The method of claim 6, wherein a result of associating the confidence score to the distance of the keypoint on the object is that the confidence score is a proxy for how visible the object is near the keypoint, and thereby how confident the trained machine learning algorithm can be of the location of that keypoint, wherein this has a consequence that the representation of the object in keypoints emphasizes the location of observable features over unobservable features.

8. The method of claim 2, wherein the locations to which the keypoints are inserted are mid-points of lines making up the ground-truth-labeled bounding boxes.

9. The method of claim 1, wherein training the machine learning algorithm further comprises:

inserting a LiDAR point cloud into a self-supervised machine learning algorithm, wherein the self-supervised machine learning algorithm is configured to identify keypoints and semantic labels associated with respective keypoints, optimizing keypoint identification such that keypoints that are located on similar objects at similar locations reduce a variance value for locations of detected keypoints on similar objects, and optimizing keypoint identification such that keypoints, when tracked over a series of frames, identify object kinematics that closely correspond to a function representing smoothed object kinematics over the series of frames, whereby the machine learning algorithm trained to identify the keypoints associated with the object is optimized to identify keypoints that are consistently identifiable and result in a better observed object kinematics, wherein the keypoints do not have a semantic value associated with them.

10. A system comprising:

a processor; and a non-transitory computer readable medium storing instructions that, when executed by the processor, cause the processor to:

input LiDAR point cloud data representing an object as perceived by a LiDAR sensor of a vehicle into an algorithm trained to identify keypoints associated with the object, wherein the keypoints represent localizable and trackable physical aspects of the object;

identify, by the algorithm, at least one keypoint associated with the object and a respective confidence score for the at least one keypoint;

determine, based on the at least one keypoint, a navigation path for the vehicle; and navigate the vehicle along the navigation path, wherein the algorithm comprises a machine learning algorithm, and training the machine learning algorithm comprises:

creating a labeled training dataset by semantically labeling parts of the object represented in LiDAR point clouds as keypoints;

inserting a LiDAR point cloud from the labeled training dataset into the machine learning algorithm;

receiving an output from the machine learning algorithm identifying keypoints and semantic labels associated with respective keypoints;

providing a loss value to the machine learning algorithm indicating whether the keypoints were properly located as compared to the labeled training dataset; and providing a loss value to the machine learning algorithm indicating whether the semantic labels were properly identified as compared to the labeled training dataset.

11. The system of claim 10, wherein training the machine learning algorithm further comprises:

processing an existing dataset by inserting training keypoints to generate a labeled training dataset, wherein the existing dataset includes a plurality of LiDAR point clouds and ground-truth-labeled bounding boxes around objects in the LiDAR point clouds, and the training keypoints are inserted on locations on the ground-truth-labeled bounding boxes wherein the training keypoints represent localizable and trackable physical aspects of the locations on ground-truth-labeled bounding-boxes;

inserting a LiDAR point cloud from the existing dataset into the machine learning algorithm;

receiving an output from the machine learning algorithm including a bounding box around the object in the LiDAR point cloud, keypoints aligned to the bounding box, and respective confidence scores associated with the keypoints aligned to the bounding box; and generating a loss value to the machine learning algorithm indicating whether the keypoints were properly located as compared to the labeled training dataset.

12. The system of claim 11, wherein the locations to which the keypoints are inserted are mid-points of lines making up the ground-truth-labeled bounding boxes.

13. The system of claim 10, wherein training the machine learning algorithm further comprises:

inserting a LiDAR point cloud into a self-supervised machine learning algorithm, wherein the self-supervised machine learning algorithm is configured to identify keypoints and semantic labels associated with respective keypoints;

optimizing keypoint identification such that keypoints that are located on similar objects at similar locations reduce a variance value for locations of detected keypoints on similar objects; and optimizing keypoint identification such that keypoints, when tracked over a series of frames, identify object kinematics that closely correspond to a function representing smoothed object kinematics over the series of frames, wherein the machine learning algorithm trained to identify the keypoints associated with the object is optimized to identify keypoints that are consistently identifiable and result in a better observed object kinematics, and wherein the keypoints do not have a semantic value associated with them.

14. A non-transitory computer readable medium comprising instructions, the instructions, when executed by a computing system, cause the computing system to:

input LiDAR point cloud data representing an object as perceived by a LiDAR sensor of a vehicle into an algorithm trained to identify keypoints associated with the object, wherein the keypoints represent localizable and trackable physical aspects of the object;

identify, by the algorithm, at least one keypoint associated with the object and a respective confidence score for the at least one keypoint;

determine, based on the at least one keypoint, a navigation path for the vehicle; and navigate the vehicle along the navigation path, wherein the algorithm comprises a machine learning algorithm, and training the machine learning algorithm comprises:

inserting a LiDAR point cloud into a self-supervised machine learning algorithm, wherein the self-supervised machine learning algorithm is configured to identify keypoints and semantic labels associated with respective keypoints;

optimizing keypoint identification such that keypoints that are located on similar objects at similar locations reduce a variance value for locations of detected keypoints on similar objects; and optimizing keypoint identification such that keypoints, when tracked over a series of frames, identify object kinematics that closely correspond to a function representing smoothed object kinematics over the series of frames, wherein the machine learning algorithm trained to identify the keypoints associated with the object is optimized to identify keypoints that are consistently identifiable and result in a better observed object kinematics, and wherein the keypoints do not have a semantic value associated with them.

15. The computer readable medium of claim 14, wherein training the machine learning algorithm further comprises:

processing an existing dataset by insert training keypoints to generate a labeled training dataset, wherein the existing dataset includes a plurality of LiDAR point clouds and ground-truth-labeled bounding boxes around objects in the LiDAR point clouds, and the training keypoints are inserted on locations on the ground-truth-labeled bounding boxes, wherein the training keypoints represent localizable and trackable physical aspects of the locations on the ground-truth-labeled bounding boxes;

inserting a LiDAR point cloud from the exist dataset into the machine learning algorithm;

receiving an output from the machine learning algorithm including a bounding box around the object in the LiDAR point cloud, keypoints aligned to the bounding box, and respective confidence scores associated with the keypoints aligned to the bounding box; and generating a loss value to the machine learning algorithm indicating whether the keypoints were properly located as compared to the labeled training dataset.

16. The computer readable medium of claim 15, wherein the locations to which the keypoints are inserted are midpoints of lines making up the ground-truth-labeled bounding boxes.

17. The computer readable medium of claim 14, wherein training the machine learning algorithm further comprises:

creating a labeled training dataset by semantically labeling parts of the object represented in LiDAR point clouds as keypoints;

inserting a LiDAR point cloud from the labeled training dataset into the machine learning algorithm;

receiving an output from the machine learning algorithm identifying keypoints and semantic labels associated with respective keypoints;

providing a loss value to the machine learning algorithm indicating whether the keypoints were properly located as compared to the labeled training dataset; and providing a loss value to the machine learning algorithm indicating whether the semantic labels were properly identified as compared to the labeled training dataset.

* * * * *